Inventors:
Emil Sennhenn
Hans Horneff
by Michael S. Striker
Attorney

Inventors:
Emil Sennhenn
Hans Horneff
by Michael S. Striker
Attorney

Inventors:
Emil Sennhenn
Hans Horneff
by Michael S. Striker
Attorney

Inventors:
Emil Sennhenn
Hans Horneff
by Michael S. Striker
Attorney

United States Patent Office 3,315,033

Patented Apr. 18, 1967

3,315,033

TRANSISTOR CLAMP CIRCUIT FOR ALTERING THE DIRECT CURRENT COMPONENT OF A TELEVISION SIGNAL

Emil Sennhenn, Darmstadt-Arheilgen, and Hans Horneff, Darmstadt, Germany, assignors to Fernseh G.m.b.H., Darmstadt, Germany Filed July 10, 1963, Ser. No. 294,085
Claims priority, application Germany, July 11, 1962, F 37,287
14 Claims. (Cl. 178—7.1)

Figure 1:
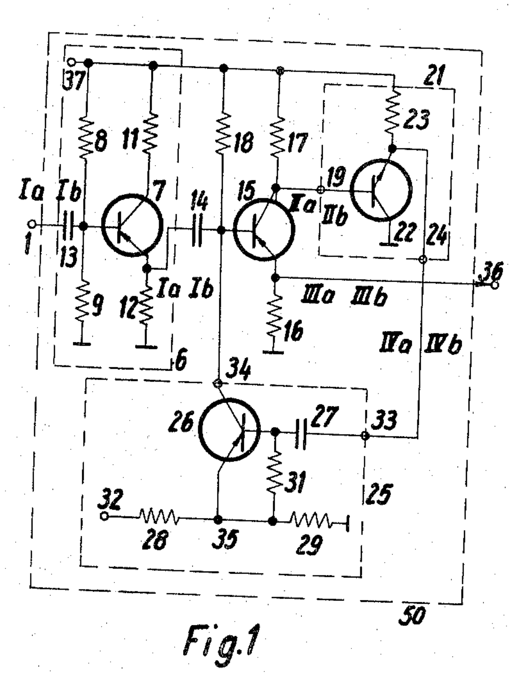

This invention relates to television signal modifying apparatus and is especially concerned to provide apparatus such that the peak potential of its output signal remains constant despite variation in the direct-current component of an applied television signal. The peak potential may correspond to the darkest, or to the brightest, area of a picture from which the television signal is derived, or to the potential of synchronizing and blanking pulses. The peak level thus defined may occur within a single line, within several lines, or within one or more frames of the video signal.

In a known arrangement for clamping the black level of a television signal at a potential corresponding to that of the darkest picture point a first diode is employed to associate the darkest picture point with a constant potential. A further diode is employed to derive a voltage which is proportional to the amplitude of the video signal during the blanking intervals. This derived voltage is used to control the value of the clipping potential of an amplitude limiting circuit through which the video signal is passed. This known circuit arrangement is found to operate satisfactorily only when the peak black potential occurs sufficiently often in the television signal. If only few peak potentials occur in the signal, then the resultant control voltage has a value which depends partly upon the signal peaks and partly upon the mean level of the video signal. The cause of this dependence upon the mean signal level is the presence of a resistor in parallel with the diode. Although in practice this resistor is given as high a value as can be accepted, this in turn introduces another disadvantage, in that the rapidity of the control action is thereby reduced.

It is an object of the present invention to provide a circuit arrangement by which the disadvantages of this known circuit arrangement are avoided.

It is a broad object of the present invention to provide a method and an apparatus for altering the direct current component of a television signal.

It is a further object of the present invention to provide a method and an apparatus for altering the direct current component of a television signal in such a way that the signal potentials coresponding to the peak levels of the television signal are held approximately at a predetermined potential.

It is still a further object of the present invention to provide a method and an apparatus for altering the direct current component of a television signal in such a way that the signal potentials corresponding to the peak levels of the picture signal components are held approximately at a predetermined potential.

It is another object of the present invention to provide an apparatus suitable for automatically maintaining a constant peak white level in a television signal. When this is done, a control voltage may be developed which is dependent upon the difference in potential between peak white and picture black and this control potential may be used to control the gain of an amplifier connected in the signal channel so as to produce a constant overall signal amplitude.

It is still another object of the present invention to provide a novel circuit arrangement for altering the direct current component of a television signal using transistors as circuit parts.

It is an additional object of the present invention to provide an apparatus for automatic control of the black level, so that every signal peak corresponding to the darkest picture point is made to correspond with a constant potential.

According to the present invention there is provided an apparatus comprising means for generating control pulses related to the peak levels of a video signal or to the peak levels of a component thereof, and means for applying said control pulses to a driven clamp circuit arranged to become operative when said video signal attains said peak levels and effecting that said peak levels are held approximately at a predetermined potential.

Apparatus according to the invention possesses the advantage that it is practically independent of the mean level of the video signal, so that the peak level of this signal is maintained at a desired, constant level even when the signal attains this peak level only rarely. Another advantage of the invention is that time-constants of approximately equal magnitude are operative during the rise and decay processes and that there is no risk of oscillation.

Figure 2:
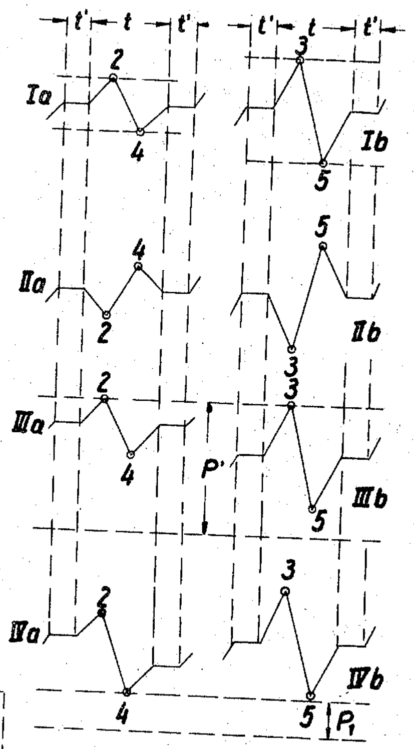
Figure 3:
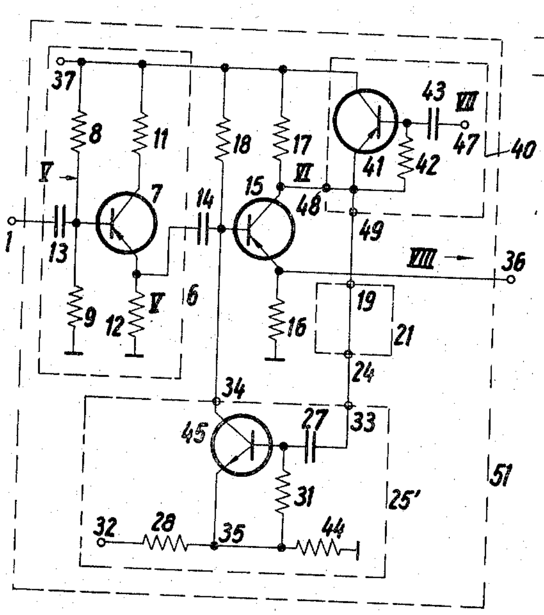
Figure 4:
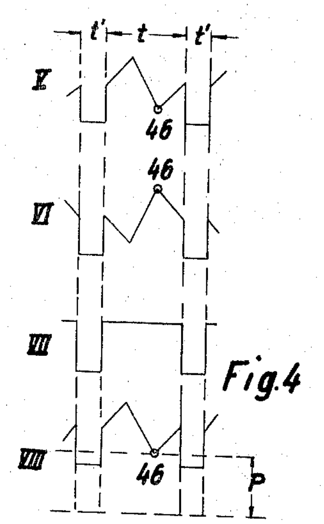
Figure 5:
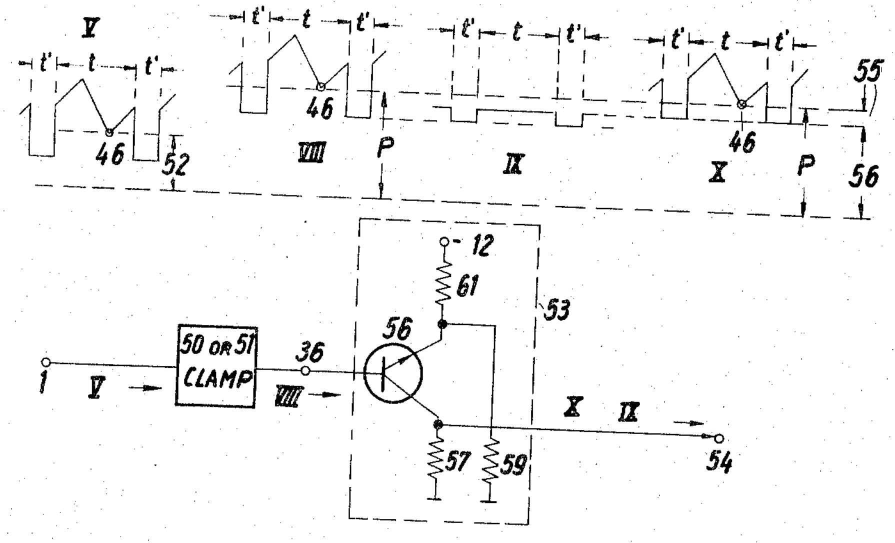
Figure 6:
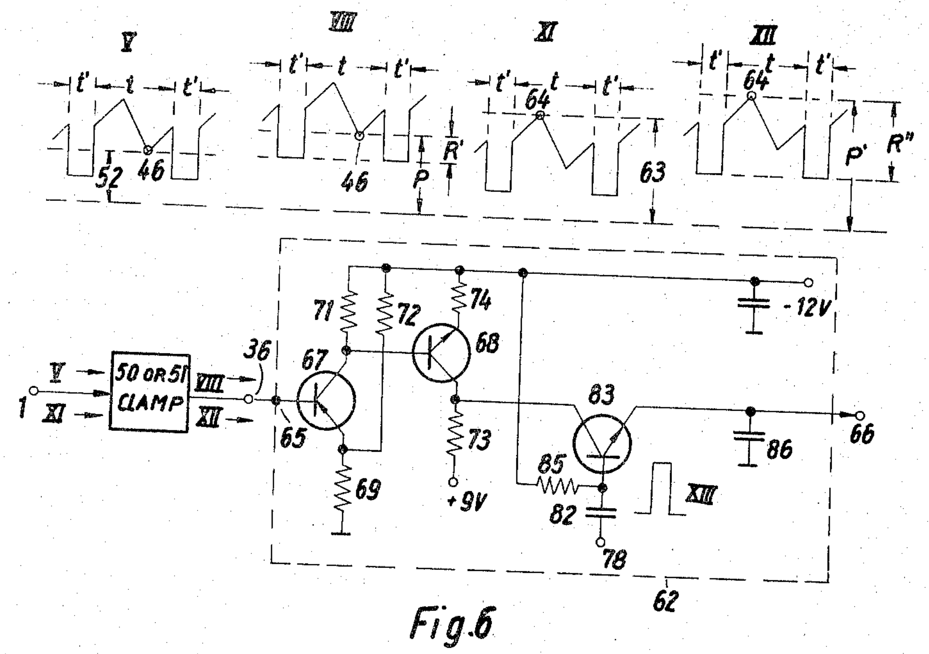
Figure 7:
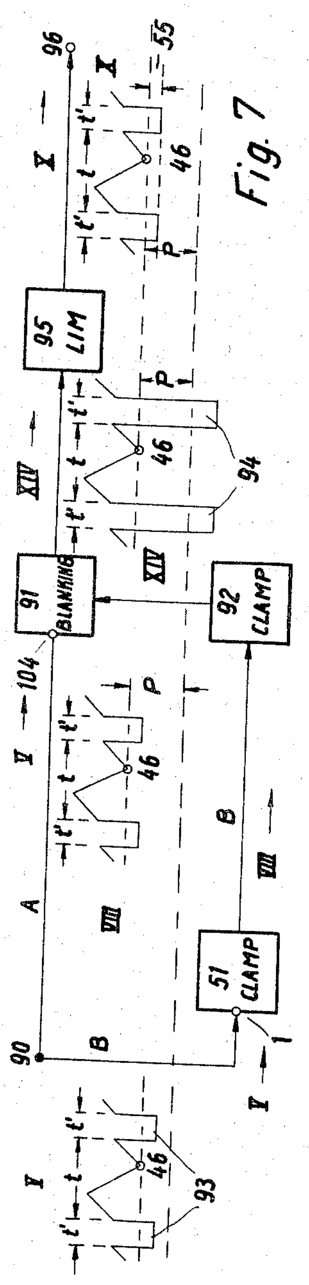
Figure 8:
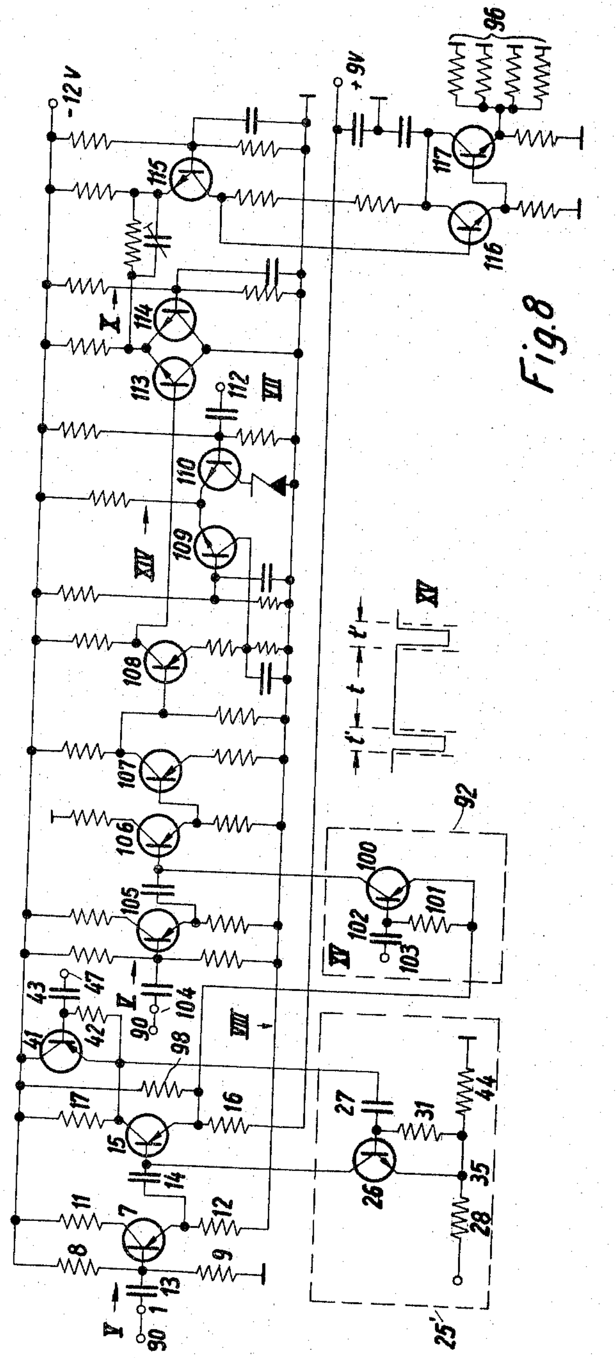
Figure 9:
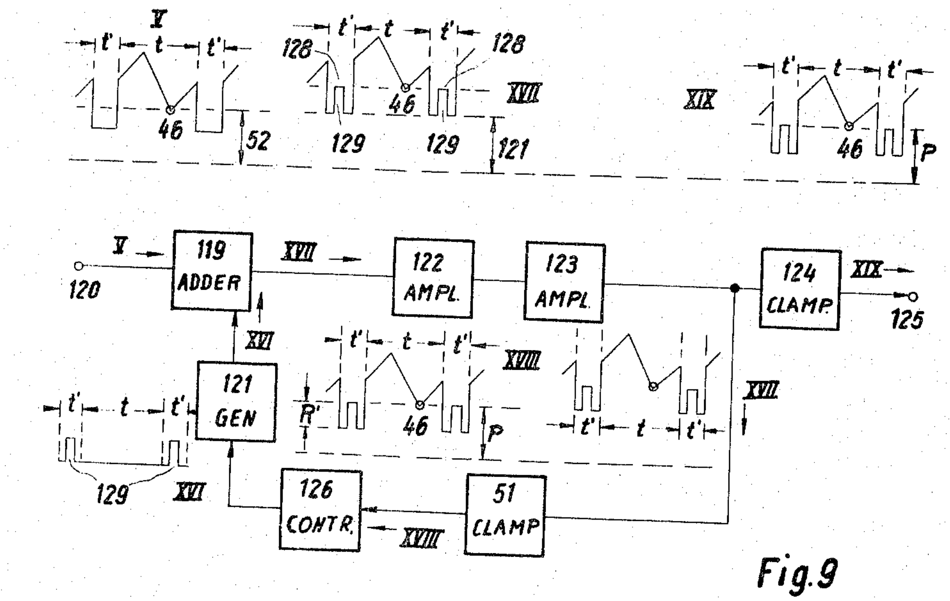
Figure 10:
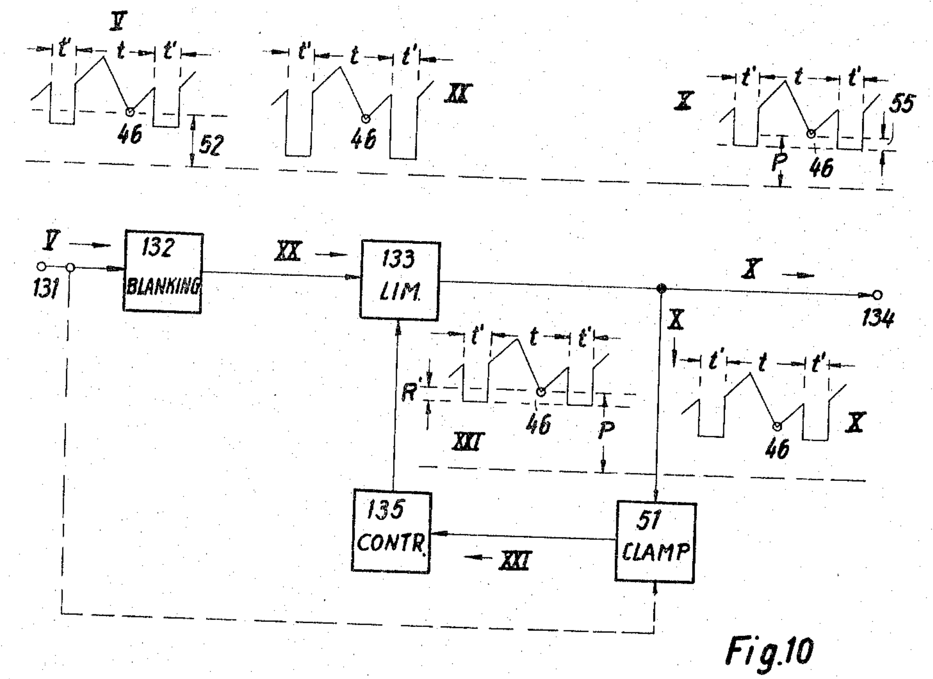

The novel features which are considered as characteristic for the invention are set forth in particular in the appended claims. The invention itself, however, both as to its construction and its method of operation together with additional objects and advantages thereof, will be best understood from the following description of specific embodiment when read in connection with the accompanying drawings, in which:

FIGURE 1 shows apparatus according to the invention for altering the direct current component of a television video signal while maintaining its peak level constant, FIGURE 2 is a series of waveform diagrams illustrating signals such as appear in the circuit arrangement of FIGURE 1, FIGURE 3 shows a modified form of the circuit arrangement of FIGURE 1, in which the signal amplitude corresponding to the darkest areas of the picture is held constant, FIGURE 4 shows a series of waveform diagrams illustrating signals such as appear in the circuit arrangement of FIGURE 3, FIGURE 5 shows a circuit arrangement suitable for limiting a video signal of which the peak is held at a constant potential, FIGURE 6 shows a circuit arrangement suitable for deriving a control potential from a video signal in which the peak level is held constant, FIGURE 7 is a block circuit diagram of apparatus for holding the signal level corresponding to the darkest picture point at a constant potential and subsequent limiting, FIGURE 8 is a circuit diagram showing in detail the circuit arrangement of FIGURE 7, FIGURE 9 shows a block circuit diagram of a circuit arrangement for maintaining constant the signal level corresponding to the darkest picture point by employing pulses injected in the signal during the blanking intervals, FIGURE 10 shows a block circuit diagram of a circuit arrangement for stabilizing the potential corresponding to the darkest picture point and subsequent limiting of the video signal to a controlled potential.

In all these drawings corresponding elements are designated by the same reference numerals.

In the circuit arrangement shown in FIGURE 1 a television signal, illustrated by Diagram I*a* or I*b* in FIGURE 2, is received at terminal 1. This signal comprises picture signal components (occurring during time *t*) and other signal components occurring during the blanking intervals (during time *t'*). The peak levels 2, 3 correspond to the brightest points of the picture, while levels 4, 5 correspond to the darkest picture points. Such video signals may be produced by any known television signal source, for example, by a television camera, film scanner, slide scanner or magnetic recording apparatus. This signal may be developed in a television studio or in an industrial television equipment, or they may be television signals developed in a television receiver and applied, for example, to modulate a picture reproducing cathode ray tube. It is assumed in the following discussion that these picture signals I*a*, I*b*—which may be those occurring at any point whatever in television transmitting or receiving equipment—have different direct-current components and in particular that their peak values 2, 3 and their minimum values 4, 5 do not correspond with constant potentials.

Video signal I*a* or I*b* is applied by way of terminal 1 to an impedance converter denoted generally by reference 6. This impedance converter is formed by a transistor 7 having respective emitter and collector lead resistors 12, 11 and having its base returned to the negative and positive supply lines by way of respective resistors 8 and 9. The signal received at terminal 1 is applied to the base of the transistor 7 by way of a capacitor 13. Component values for this stage may conveniently be:

| | |
|---|---|
| Resistor **8** | 10 KΩ |
| Resistor **9** | 2.7 KΩ |
| Resistor **11** | 150Ω |
| Resistor **12** | 220Ω |
| Transistor **7** | AF–118 |
| Capacitor **13** | 50 μf. |

The positive supply received at terminal 37 may have a voltage of −12 volts.

From the emitter of transistor 7 the signal is applied to an amplifier stage, passing by way of a capacitor 14 to the base of a transistor 15. This transistor has in its emitter lead a load resistor 16, from which an output signal is fed to an output terminal 36, and in its collector lead a further load resistor 17, the signal appearing across which is processed to generate control pulses. The base of transistor 15 is returned to the positive supply line by way of a resistor 18, and is also connected to a clamp circuit 25 by way of a terminal 34. Component values for this amplifier stage may conveniently be:

| | |
|---|---|
| Capacitor **14** | 50 μf. |
| Transistor **15** | AF–118 |
| Resistor **16** | 180Ω |
| Resistor **17** | 680Ω |
| Resistor **18** | 560Ω |

From the collector of transistor 15 the signals are applied to an impedance converter stage denoted generally by reference 21. At this point 19 in the circuit the signals have the form shown by waveform II*a* or II*b* in FIGURE 2. From point 19 the signal is applied to the base of a transistor 22, having in its emitter lead a load resistor 23, the signals appearing across which are applied by way of points 24 and 33 in the clamp circuit denoted generally by reference 25. The impedance converter transistor 22 may be of type OC–141 and resistor 23 may have a value of 220Ω.

Clamp circuit 25 is formed by a transistor 26 having its collector connected to terminal 34, that is, to the base of transistor 15, while its emitter is returned to a suitable potential derived by a potential divider composed of resistors 28 and 29 connected between the −12 v. supply received at terminal 32 and earth. The base of transistor 26 is returned to the collector by way of a resistor 31 and the signals applied to point 33 in the circuit are fed to it by way of a capacitor 27. Component values for this stage may conveniently be:

| | |
|---|---|
| Transistor **26** | 2SA17 |
| Capacitor **27** | 2 μf. |
| Resistor **28** | 1.8K |
| Resistor **29** | 560Ω |
| Resistor **31** | 22K |

The signals II*a* or II*b* thus applied to clamp circuit 25 cause the transistor 26 to become conductive during the negative-going peaks 2, 3, thus connecting the base of transistor 15 to a constant potential appearing at point 35. The signal appearing at the emitter of transistor 15 thus has the form indicated by waveforms III*a* or III*b* of FIGURE 2, the negative-going peaks of the signal being held at a constant potential.

If the pnp clamping transistor 26 illustrated in FIGURE 1 is replaced by a transistor of the npn type, then this npn transistor will be made conductive by the positive-going peaks 4, 5 of the video signals II*a* or II*b*, so that the output signals appearing at terminal 36 will be of the forms illustrated by waveform IV*a* or IV*b*, the peaks 4, 5 being held at a constant potential.

It is not in all cases necessary to employ impedance converter 21, so that points 19 and 24 in the circuit may then be connected directly together.

In many cases it is required that the clamp circuit 25 shall be operated, not by every peak value appearing in the video signal, but by the peak values of a portion only of this signal, for example, those peak values occurring during the time *t*. FIGURE 3 illustrates a circuit arrangement suitable for performing such an operation and differs from FIGURE 1 mainly in the addition of a gating stage 40 which prevents signal components occurring during the intervals *t'* from affecting the clamping action. Signal waveforms such as arise in this arrangement when in operation are illustrated in FIGURE 4.

The gating stage 40 added to the arrangement of FIGURE 3 consists of a transistor 41 of which the emitter-collector path is connected in shunt with the collector load 17 of amplifier transistor 15, so that when transistor 41 becomes conductive the collector of transistor 15 is held at the potential of the negative supply line. The base of transistor 41 is returned to its emitter by way of a resistor 42 and appropriately-timed negative-going pulses received at a terminal 47 are applied to the base of transistor 41 by way of a capacitor 43. Component values for this gating stage may conveniently be:

| | |
|---|---|
| Transistor **41** | 2SA17 |
| Resistor **42** | 22 KΩ |
| Capacitor **43** | 50 μf. |

The video signal illustrated by waveform V in FIGURE 4 is applied to terminal 1 of FIGURE 3. It will be seen that the potential of this signal during the blanking intervals *t'* is more negative than that corresponding to the darkest point in the picture, shown at 46. As far as the collector of transistor 15 the circuit arrangement of FIGURE 3 is identical with that of FIGURE 1 and need not be further described. To the collector of transistor 15, however, there is connected the gating stage 40 described above, which suppresses the signals occurring during the blanking intervals, so that the signal appearing at the collector of transistor 15 is of the form illustrated by waveform VI of FIGURE 4. Specifically, negative-going impulses as illustrated by waveform VII of FIG- URE 4 are applied to the base of transistor 41 to render the transistor conductive during the blanking intervals. The video signal of waveform VI is thus applied from the collector of transistor 15 by way of points 48, 49, 19, 24 and 33 in the circuit to a clamp circuit 25′ which when operative holds the base of transistor 15 at a predetermined potential. Clamp circuit 25′ differs from clamp circuit 25 of FIGURE 1 in that an npn transistor 45, which may be of type OC–141, replaces the pnp transistor 26 of FIGURE 1 and that a resistor 44 having a value of 270Ω replaces the resistor 29 of FIGURE 1.

The operation of the circuit of FIGURE 3 is that clamp circuit 25′ becomes operative only during the most negative-going peaks 46 of the picture signal component which occur during the time *t*, so that the signal represented by waveform VIII in FIGURE 4 appears at output terminal 36.

In the arrangement described with reference to FIGURE 1, which will hereinafter be generally denoted by reference numeral 50, and with reference to FIGURE 3, which will hereinafter be denoted generally by the reference 51, the video signal is taken from the collector of transistor 15 and is applied by way of point 33 to the clamp circuit 25 or 25′. The video signal used to generate the control pulses may, however, be taken at any other point whatever in the signal path, for example, from the collector of transistor 7 (making allowance for the polarity of the video signal) and, possibly with the interposition of an impedance-converter stage such as 21 or a gating stage such as 40, may be applied by way of point 33 in the circuit to control a clamp circuit such as 25 or 25′. Since the transit time of the signal is finite, it may be advantageous to take the video signal from a point in the signal channel in advance of the point at which the clamping is effected.

The circuit arrangement which is shown in FIGURE 5 may be used to effect clamping of the signal at its brightest or darkest points and subsequently to limit the overall amplitude of the signal. A video signal V is applied to the circuit arrangement at terminal 1, whence it passes to a circuit arrangement corresponding with the arrangement 50 of FIGURE 1 or the arrangement 51 of FIGURE 3. From this arrangement there is delivered a video signal, shown by waveform VIII, in which the darkest picture point 46, the potential 52 of which is assumed to fluctuate in the initial signal V, is held at a predetermined potential P. The video signal VIII appearing at output terminal 36 is applied to an amplitude limiter circuit 53, which yields at output terminal 54 a signal having the waveform shown at IX.

The circuit arrangement described above in relation to FIGURE 5 may be employed, for example, firstly to stabilize a television video signal appearing in a television receiver to the darkest picture point and then to clip off the synchronizing pulses. By making use of a limiter operating in the opposite polarity, however, it would also be possible to develop a video signal of the form shown at waveform X, where the potential 55—the lift or pedestal by which the darkest picture point exceeds the blanking potential 56 set by the clipping level—is determined by the difference between the predetermined potential P to which the darkest picture point 46 is held and the clipping level 56.

The limiter circuit 53 is of known construction, comprising a transistor 56 to the base of which the input signals are applied. The collector potential of this transistor is set by a potential divider formed by resistors 59 and 61 connected from the collector to the positive and negative supply lines respectively. The emitter of transistor 56 is connected to the positive supply line by way of a load resistor 57, across which there appear the output signals delivered at output terminal 54. Component values for this limiter stage may conveniently be:

| | |
|---|---|
| Transistor 56 | AF–118 |
| Resistor 57 | 2.2 KΩ |

| | |
|---|---|
| Resistor 59 | 3.3 KΩ |
| Resistor 61 | 220Ω |

The circuit arrangement illustrated by FIGURE 6 consists of an arrangement 50 or 51 of the kind previously described in relation to FIGURE 1 or FIGURE 3 and therefore yielding at the output terminal 36 a video signal in which the darkest or the brightest picture points are stabilized at a predetermined potential. This video signal is then applied to a control stage 62 in which there is developed a control potential proportional to the difference in potential between the peak level of the signal and a predetermined potential. This control potential may be employed for gain control of the video signal.

In one mode of operation the video signal V is applied to the point terminal 1. In this video signal the potential 52 corresponding to the darkest point of the picture signal is assumed to be subject to fluctuation This signal is applied to an arrangement 50 as described with reference to FIGURE 1, so that there is obtained at the output terminal 36 of this arrangement a video signal VIII in which the darkest picture point 46 is held to a fixed potential P.

In another mode of operation the video signal XI is applied to input terminal 1. In this video signal the potential 63 of the brightest picture point 64 is assumed to be subject fluctuation. This signal is applied to an arrangement 51 as described with reference to FIGURE 3, so that there is obtained at its output terminal 36 a video signal as shown by waveform XII, in which the brightest picture point is held at a predetermined potential P′.

In the mode of operation first described the control stage 62 delivers at output terminal 66 a potential corresponding to the potential R′ of waveform VIII, that is, to the potential difference between the darkest picture point and the blanking level. In the mode of operation laterly described the control stage 62 delivers at output terminal 66 a potential corresponding to the potential R″ shown in waveform XII, that is, to the difference in potential between the brightest picture point and the blanking level. The control potential proportional to R′ may be employed to control the limiting potential of a clipper stage, while the control potential proportional to R″ may be used to effect gain control of the video signal to produce so-called "white level control." It is also possible, however, to employ these control voltages to influence the characteristic of a non-linear amplifier included in the signal path, so that at all times the peak potentials (46 or 64) of the applied video signal are held to predetermined values.

The signal appearing at point 36 in the circuit is applied by way of point 65 to the base of a transistor 67 connected to operate as a common-emitter amplifier. The emitter of transistor 67 is returned to the positive supply line by way of a resistor 69 and to the negative supply line by way of a resistor 72, so that it is held at an appropriate direct potential. In the collector lead of transistor 67 there is connected a load resistor 71, signals appearing across which are applied directly to the base of a transistor 68 of the npn type, which is also connected to operate as a common-emitter amplifier. Transistor 68 has its collector taken to a source of direct potential at +9 volts and its emitter is connected to the −12 v. supply by way of a resistor 74. The signal appearing across the load resistor 73 of transistor 68 is applied to the collector of a switching transistor 83. Transistor 83, which is of the npn type, is normally cut off by its base being returned to the −12 v. line through a resistor 85, but it is rendered conductive during the blanking intervals by positive-going impulses, shown by waveform XIII, which are received at terminal 78 and are applied by way of a capacitor 82 to the base of the transistor. When transistor 83 becomes conductive, the potential appearing on the collector of transistor 68 is applied to a capacitor 86, which thus becomes charged to a potential corresponding to the potential difference R′ or R″. The potential appearing across capacitor 86 is fed out by way of an output terminal 66 for use as desired. Suitable component values for the circuit 62 of FIGURE 6 are as follows:

| | |
|---|---|
| Transistor 67 | 2SA18 |
| Transistor 68 | OC–141 |
| Transistor 83 | OC–141 |
| Capacitor 82 | 0.1 μf. |
| Capacitor 86 | 50 μf. |
| Resistor 69 | 220 Ω |
| Resistor 71 | 2.2 KΩ |
| Resistor 72 | 2.7 KΩ |
| Resistor 73 | 2.2 KΩ |
| Resistor 74 | 220 Ω |
| Resistor 85 | 22 KΩ |

FIGURE 7 shows a block diagram of a circuit arrangement which may be used to carry out a clamping operation such that the darkest picture point of an applied video signal is held at a constant potential and the signal amplitude is subsequently limited. Here the video signal V received at an input terminal 90 is applied to two signal channels denoted generally by reference A and B respectively. In the main signal channel A the video signal is applied to a blanking stage 91 and thence to an amplitude limiter stage 95 from which the limited signal passes to an output terminal 96. In channel B the signal is applied to a circuit arrangement 51 as described in relation to FIGURE 3. The signal obtained from circuit arrangement 51 is applied to a driven clamp stage 92 by means of which the signal level during the horizontal blanking intervals is held to a reference potential which depends upon the potential difference between the peak signal level 46 corresponding to the darkest picture point and the blanking level 93.

The output signal from blanking stage 91 thus comprises a video signal as represented by waveform XIV in which the signal level corresponding to the darkest picture point is held at a constant potential P and the blanking pulses 94 are of such an amplitude that any unwanted signals occurring during the blanking interval are removed outside the normal range of signal amplitudes The subsequent limiter stage 95 clips the blanking pulses to yield at output terminal 96 a video signal X in which the blanking level differs in potential from the darkest picture point potential P by a constant potential 55.

FIGURE 8 illustrates the complete circuit diagram of a circuit arrangement for performing the functions described above in relation to FIGURE 7. The video signal V received at input terminal 1 from terminal 90 is applied by way of a capacitor 13 to the base of a transistor 7, from the emitter of which it is fed through a capacitor 14 to the base of a further transistor 15, where it is clamped at its peaks as described in relation to FIGURE 3 by the use of gating transistor 41 and clamp circuit 25′. The stabilized signal appearing at the emitter of transistor 15 is applied to a driven clamp stage 92 as its reference potential. Clamp stage 92 consists of a transistor 100 having its emitter connected to that of transistor 15. The base of transistor 100 is returned to its emitter by way of a resistor 101 and it is periodically rendered conductive by negative-going impulses, illustrated by waveform XV, which are received at terminal 103 and applied by way of a capacitor 102 to the base of the transistor 100.

The video signal V is also applied from terminal 90 input terminal 104 of a blanking amplifier which consists of transistor 105, 106, 107, 108, 109 and 110 with their associated components. The signal from the emitter of transistor 105 is passed on to the base of transistor 106, where it is clamped to the reference potential of clamp stage 92. This clamp circuit operates for periods of less than the duration of the line blanking periods and situated wholly within those periods, as shown by waveform XV. The clamped signal arising at the emitter of transistor 106 is connected to the base of transistor 107, by which it is amplified and applied to the base of transistor 108. Into the emitter circuit of this transistor are injected pulses having the full duration of the blanking periods, such as are illustrated by waveform VII. These pulses are shaped by a trigger circuit formed by the emitter-coupled transistors 110 and 109, the collector load of transistor 109 being formed by a resistor connected in the emitter lead of transistor 108. The re-blanked signal represented by waveform XIV which thus appears at the collector of transistor 108 is taken to an amplitude limiter formed by transistors 113, 114 of which the emitter-collector paths are connected in parallel. The signal to be limited is applied to the base of transistor 113, while the base of transistor 114 is held at a selected potential by means of a potential divider connected across the supply. The amplitude-limited or clipped signal represented by waveform X which thus appears across the common emitter load of transistor 113, 114 is amplified by a transistor 115 connected in the common-base configuration and is fed out by way of parallel outputs 96 which are supplied by an impedance converter formed by transistors 116, 117. The detailed operation of all these transistors is well known in the art and it is not thought necessary that it should be further described, being well known to those skilled in the art.

In the circuit arrangement illustrated by FIGURE 9, video signals of waveform V are received at a terminal 120 whence they are applied to a mixer stage 119 in which there is added to the video signal a train of impulses developed by an impulse generator 121. These impulses are of the same polarity as the picture signal and occur wholly within the blanking intervals, as illustrated by waveform XVI. The output signal from mixer 119 is thus of the form illustrated by waveform XVII. This signal is applied by way of a non-linear amplifier 122, 123 to a clamp stage 124. The signal applied to the input of clamping stage 124 is also applied to an arrangement 51 of the kind described in relation to FIGURE 3, in the output signal from which, illustrated by waveform XVIII, the signal peaks corresponding to the darkest picture point (exemplified by point 46) are stabilized at a constant predetermined potential P. The stabilized signal from device 51 is applied to a stage 126 in which there is derived a control voltage dependent upon the potential difference R′ between the stabilized blackest picture point and the tips of the synchronizing impulses. The control voltage is applied to the pulse generator 121 to control the amplitude of the generated pulses in such a manner that the tips of these impulses have the same potential as the stabilized blackest picture points. The clamping stage 124 is arranged to stabilize the signal potential at a time during the existence of the injected impulses from generator 121, so that the video signal is thus effectively stabilized to the level of the darkest picture point. The output signal from clamp stage 124 thus has the waveform illustrated by waveform diagram XIX.

In the circuit arrangement illustrated in FIGURE 10, a video signal V is applied at terminal 131. This video signal is applied to a blanking stage 132 which yields the signal illustrated by waveform XX, which is then amplitude limited in a limiter circuit 133, yielding the video signal represented by waveform X, which is fed to an output terminal 134. Video signal X is also applied to an arrangement 51 as described in relation to FIGURE 3, from which there is obtained a signal as illustrated by waveform XXI, in which the signal potential corresponding with the darkest picture point is stabilized to a predetermined potential P. This stabilized signal is then applied to a stage 135 in which there is derived a control voltage proportional to the potential difference R′ between the darkest picture point 46 and the tips of the blanking impulses, and this control voltage is applied to the limiter stage 133 to vary the limiting level in such a manner as to maintain constant the potential difference, shown at 55 in waveform X, between the darkest picture point and the tips of the blanking impulses.

While the invention has been illustrated and described as embodied in an arrangement for altering the direct current component of a television signal it is not intended to be limited to the details shown, since various modifications and structural changes may be made without departing in any way from the spirit of the present invention.

What is claimed as new and desired to be secured by Letters Patent is:

1. Apparatus for altering the direct current component of a television signal being composed of picture signal components and further signal components, the peak levels of said further signal components not exceeding the peak levels of said picture signal components, in such a way that the signal potentials corresponding to the peak levels of said television signal are held approximately at a predetermined potential, said television signal being conducted within a first signal channel, comprising in combination, a capacitor; a transistor; connection means connecting one first point of said first signal channel within a second signal channel via said capacitor to the base of said transistor; connection means connecting the emitter/collector path of said transistor with a second point of said first signal channel and to a point held at said predetermined potential; a resistor; and further connection means connecting the base of said transistor via said resistor to its emitter.

2. Apparatus according to claim 1, comprising, an impedance converter being connected between said first point of said first signal channel and said capacitor.

3. Apparatus for altering the direct current component of a television signal being composed of picture signal components and further signal components, the peak levels of said further signal components not exceeding the peak levels of said picture signal components, in such a way that the signal potentials corresponding to the peak levels of said television signal are held approximately at a predetermined potential, said television signal being conducted within a first signal channel, comprising in combination, a capacitor; a transistor; connection means connecting one first point of said first signal channel to a second signal channel via said capacitor to the base of said transistor; connection means connecting the emitter/collector path of said transistor with a second point of said first signal channel and with a point held at said predetermined potential; a resistor; further connection means connecting the base of said transistor via said resistor to its emitter; a further capacitor; a further transistor including a base electrode, and a second and third electrode forming together an emitter/collector path; connection means applying said television signal via said further capacitor and within said first signal channel to said base electrode of said further transistor; connection means connecting said second emitter electrode of said further transistor within said second signal channel via said capacitor to said base electrode of said further transistor; further resistor means connecting said emitter/collector path of said further transistor to said base electrode of said further transistor to said point held at said predetrmined potential.

4. Apparatus for alterinr the direct current component of a television signal being composed of picture signal components and of further signal components, said television signal being conducted within a first signal channel and its direct current component being altered in such a way that the signal potentials corresponding to the peak levels of said picture signal components are held approximately at a predetermined potential, comprising in combination, a driven clamp circuit conductively connecting its first and second leads whenever a control pulse arrives at its third lead; a generator having an input lead and an output lead, generating control pulses occurring approximately at the same time as said peak levels of said picture signal components; a gating stage for suppressing said further signal components; connection means connecting a first point of said first signal channel via a second signal channel and via said gating stage to said input lead of said generator; connection means connecting the output lead of said generator to said third lead of said clamp circuit; connection means connecting a second point of said first signal channel to said first lead of said clamp circuit; further connection means connecting said second lead of said clamp circuit to a point held at said predetermined potential.

5. Apparatus according to claim 4 for altering the direct current component of a television signal in such a way that the signal potentials corresponding to the brightest points of the picture are held approximately at a predetermined potential.

6. Apparatus according to claim 4 for altering the direct current component of a television signal in such a way that the signal potentials corresponding to the darkest points of the picture are held approximately at a predetermined potential.

7. Apparatus for alternating the direct current component of a television signal and for limiting the amplitude of said altered television signals being composed of picture signal components and of blanking signal components, said television signal being conducted within a first signal channel and its direct current component being altered in such a way that the signal potentials corresponding to the peak levels of said picture signal components are held approximately at a predetermined potential, comprising in combination, a driven clamp circuit conductively connecting its first and second leads whenever a control pulse arrives at its third lead; a generator having an input lead and an output lead generating control pulses occurring approximately at the same time as said peak levels of said picture signal components; a gating stage suppressing said blanking signal components; connection means connecting a first point of said first signal channel via a second signal channel and via said gating stage to said input lead of said generator; connection means connecting the output lead of said generator to said third lead of said clamp circuit; connection means connecting a second point of said first signal channel to said first lead of said clamp circuit; further connection means connecting said second lead of said clamp circuit to a point held at said predetermined potential, a limiter limiting the amplitude of signals applied to its input lead; connection means applying said altered television signal to the input lead of said limiter.

8. Apparatus according to claim 7, comprising, means for deriving from said altered television signals a control voltage dependent upon the difference in potential between said peak levels and the potential of said blanking components; a control stage altering the limiting level of said limiter; and connection means applying said control voltage to said control stage.

9. Apparatus according to claim 7 comprising means for deriving from said altered television signals a control voltage dependent upon the difference in potential between said peak levels and the potential of said blanking signal components; a control stage varying the gain of an amplifier in said first signal channel through which said altered television signal passes thereby stabilizing the potential of said peak levels.

10. Apparatus for altering the direct current component of a television signal being composed of picture signal components and of further signal components occurring during the flyback intervals in the scanning process, said television signal being conducted within a main signal channel and its direct current component being altered in such a way that the signal potentials corresponding to the peak levels of said picture signal components are held approximately at a predetermined potential, comprising in combination, a pulse generator generating rectangular pulses occurring within the flyback intervals; a mixer mixing two signals applied to its two input leads; connection means applying said television signal within said main signal channel to one input lead of said mixer; connection means applying the output of said pulse generator to the second input lead of said mixer; a clamping stage being driven by further rectangular pulses occurring within the period of said rectangular pulses; connection means connecting the output lead of said mixer within said main signal channel to the output lead of the apparatus; connection means connecting one point of the main signal channel beyond said mixer to said clamping stage; a driven clamp circuit conductively connecting its first and second leads whenever a control pulse arrives at its third lead; a generator having an input lead and an output lead generating control pulses occurring approximately at the same time as said peak levels of said picture signal components; a first signal channel being connected to said main signal channel between said mixer and said point beyond said mixer; a gating stage for suppressing said further signal components; connection means connecting a first point of said first signal channel via a second signal channel and via said gating stage to said input lead of said generator; connection means connecting the output lead of said generator to said third lead of said clamp circuit; connection means connecting a second point of said first signal channel to said first lead of said clamp circuit; further connection means connecting said second lead of said clamp circuit to a point held at said predetermined potential; a control stage generating a control voltage responsive to the potential difference of said further signal components and controlling the amplitude of said rectangular pulses in dependence upon said control voltage in such a way that the amplitude of said rectangular pulses is equal to said potential difference; and connection means connecting said first signal channel to said control stage.

11. Apparatus for altering the direct current component of a television signal and for limiting the amplitude of said altered television signal being composed of picture signal components and of further signal components occurring within the flyback periods, said television signal being conducted within a main signal channel via an input point towards an output point and its direct current component being altered in such a way that the signal potentials corresponding to the peak levels of said picture signal components are held approximately at a predetermined potential, comprising in combination a blanking stage having two input leads and an output lead, mixing two signals applied to its two input leads; a limiter limiting amplitudes of signals applied to its input; connection means applying said television signal within said main signal channel to one input of said blanking stage; connection means connecting the output of said blanking stage to the input lead of said limiter; connection means connecting the output lead of said limiter to said output point of said main signal channel; a driven clamp circuit conductively connecting its first and second leads whenever a control pulse arrives at its third lead; a generator having an input lead and an output lead generating control pulses occurring at the same time as said peak levels of said picture signal components; a first signal channel being connected to a point of said main signal channel between said input point and said blanking stage; a gating stage suppressing said further signal components; connection means connecting a first point of said first signal channel via a second signal channel and via said gating stage to said input lead of said generator; connection means connecting the output lead of said generator to said third lead of said clamp circuit; connection means connecting a second point of said first signal channel to said first lead of said clamp circuit; further connection means connecting said second lead of said clamp circuit to a point held at said predetermined potential; a clamp stage conductively connecting its first and second leads whenever a control signal arrives during the flyback period at its third lead; connection means connecting the first lead of said clamp stage with said main signal channel between said input point and said blanking stage; a control stage generating a control voltage dependent upon the potential difference between said peak levels and the potential of said further signal components; connection means connecting said first signal channel to said control stage; connection means applying said control voltage to said second lead of said clamp circuit in order to control the reference level of said clamp stage; a generator generating said control signal; and connection means connecting the output of said generator to said third lead of said clamp stage.

12. Apparatus for altering the direct current component of a television signal being composed of picture signal components and of further signal components, said television signal being conducted within a first signal channel and its direct current component being altered in such a way that the signal potentials corresponding to the peak levels of said picture signal components are held approximately at a predetermined potential, comprising in combination a gating stage suppressing said further signal components; a capacitor; a transistor; connection means connecting one first point of said first signal channel within a second signal channel via said gating stage and via said capacitor to the base of said transistor; connection means connecting the emitter/collector path of said transistor with a second point of said first signal channel and to a point held at said predetermined potential; a resistor; and further connection means connecting the base of said transistor via said resistor to its emitter.

13. Apparatus according to claim 12, comprising, an impedance converter being connected between said first point of said first signal channel and said gating stage.

14. Apparatus according to claim 12 comprising a further capacitor; a further transistor including a base electrode, and a second and third electrode forming together an emitter/collector path; connection means applying said television signal via said further capacitor and within said first signal channel to said base electrode of said further transistor; resistor means connecting said second emitter electrode of said further transistor within said second signal channel via said gating stage and via said capacitor to said base electrode of said further transistor; connection means connecting said third electrode of said further transistor to an output lead supplying said television signal with said predetermined potential corresponding to one peak level of the television signal; and further connection means connecting said emitter/collector path of said further transistor to said base electrode of said further transistor and to said point held at said predetermined potential.

References Cited by the Examiner

UNITED STATES PATENTS 3,013,116 12/1961 Sziklai .............. 178—7.5

FOREIGN PATENTS 1,218,764 5/1960 France.

DAVID G. REDINBAUGH, *Primary Examiner.*

J. McHUGH, R. L. RICHARDSON, *Assistant Examiners.*